M. E. COX.
TRANSMISSION MECHANISM.
APPLICATION FILED MAR. 20, 1918.
1,277,295.
Patented Aug. 27, 1918.
2 SHEETS—SHEET 2.
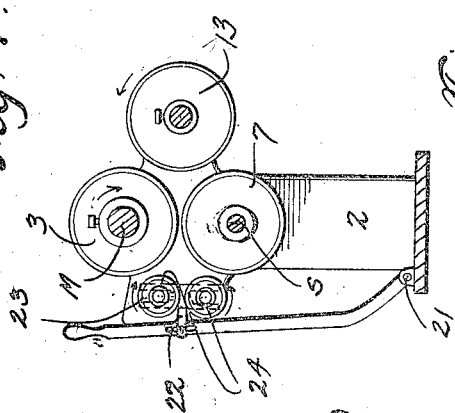
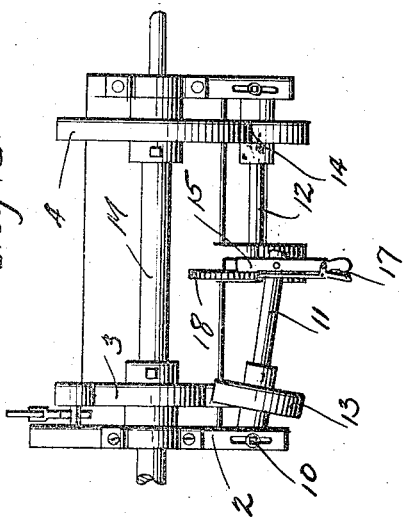
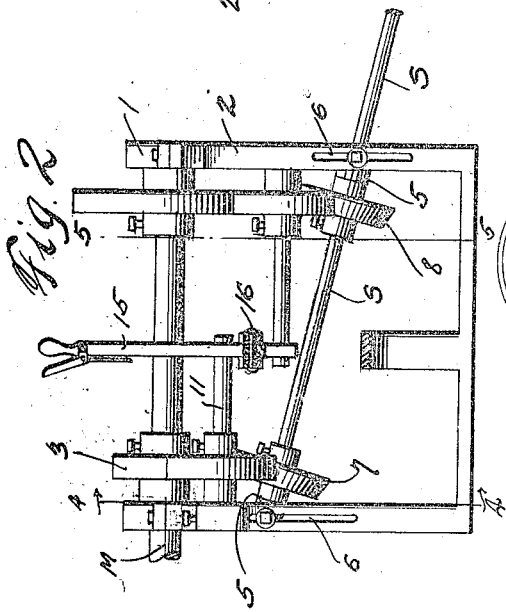
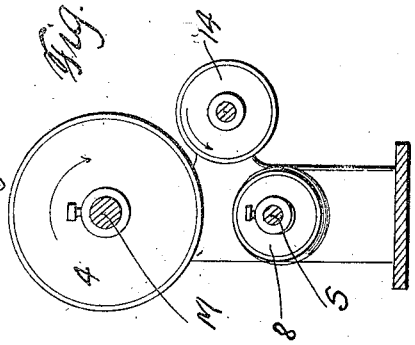
INVENTOR
Martin E. Cox
BY *Richard B. Owen*,
ATTORNEY
WITNESSES

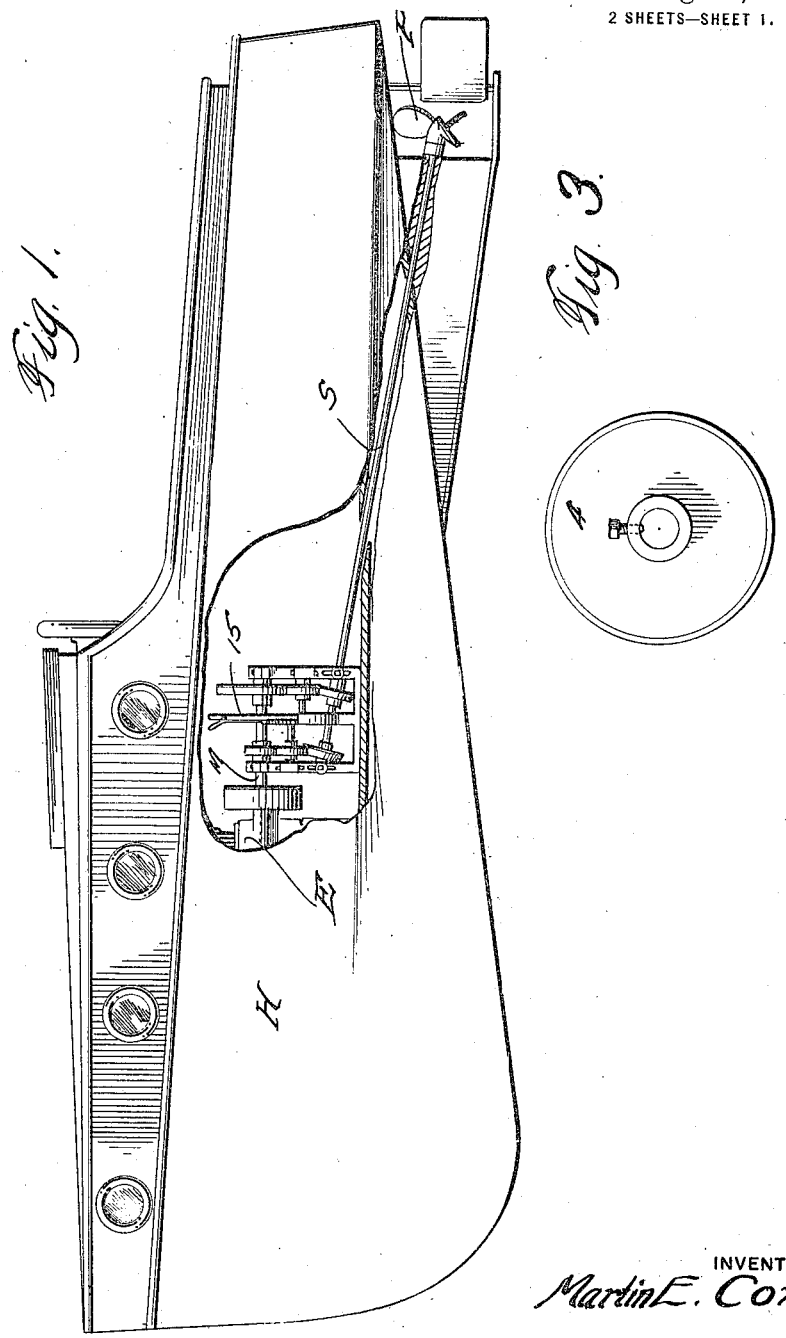

UNITED STATES PATENT OFFICE.

MARTIN E. COX, OF CARMICHAEL, MARYLAND.

TRANSMISSION MECHANISM.

1,277,295.

Specification of Letters Patent.

Patented Aug. 27, 1918.

Application filed March 20, 1918. Serial No. 223,588.

*To all whom it may concern:*

Be it known that I, MARTIN E. COX, a citizen of the United States, residing at Carmichael, in the county of Queen Annes and State of Maryland, have invented certain new and useful Improvements in Transmission Mechanism, of which the following is a specification.

This invention relates to machine elements, and more especially to gearing; and the object of the same is to construct a transmission mechanism particularly adapted for use in connection with the engines of motor boats and the like, wherein change of speed and of the direction of rotation is effected by the shifting of levers, and the movements of friction gears or disks.

Details will be found in the following specification, and reference is made to the drawings herewith and in which:—

Figure 1 is a side elevation of this transmission mechanism complete, also disclosing a side elevation of a motor boat and showing the position of this mechanism therein with respect to the engine and the propeller, Fig. 2 is an enlarged left side elevation of the transmission mechanism, Fig. 3 is a detail of the power wheel, Figs. 4 and 5 are sections on the lines 4—4 and 5—5 of Fig. 2, Fig. 6 is a plan view of the transmission mechanism.

I have illustrated my improved transmission mechanism as used in connection with a motor boat whose hull H is shown in Fig. 1 broken away and partly in section to disclose the relative position of this mechanism with respect to the engine E and its main shaft M, which we may call the power element, and the propeller P and its shaft S which we may call the driven element. These elements exist in other connections, but in a motor boat of the type illustrated the shaft S is at an angle to the horizontal whereas the shaft M is preferably strictly horizontal, and certain details in the construction of the transmission mechanism are necessary in order to make up for this peculiar disposition of the shafts with which we are concerned. Otherwise I do not wish to be limited to the use of my invention, nor to details which are not brought out below.

Coming now to the present invention, no clutch is shown between the engine and the transmission mechanism, but the main or power shaft M is extended to the rear from the engine and mounted in bearings 1 in a frame 2, between which bearings it has two power wheels 3 and 4 whereof the former is smaller than the latter for relative low speed. The driven element which is the propeller shaft S extends obliquely upward through the frame 2 and is mounted in bearings 5 which are by preference adjustable in slots 6 in said frame, and at proper points this shaft carries driven wheels 7 and 8, the same being slightly conical as shown so that their peripheries will make proper contact with the idlers yet to be described.

Two short shafts 11 and 12 have loosely mounted on them the idlers 13 and 14 respectively, the outer end of each shaft being pivoted at 10 in the frame 2. The inner ends of the shafts are connected with an upright lever 15 above and below its point 16 of pivotal support respectively, and means such as a thumb latch 17 and a toothed rack 18 are provided for permitting the adjustment of this lever to various positions and holding it set when so adjusted. It will now be obvious that when the lever is swung in such direction that the idler 13 is thrown into contact with the power pulley 3 and the driven pulley 7 (see Fig. 4) the shaft S will be rotated at a moderate rate of speed; but when the lever is moved in the opposite direction so that the idler 14 is thrown into contact with the large power wheel 4 and the driven pulley 8 (see Fig. 5), the shaft S will be rotated in the same direction but at a relatively higher speed. At any point between these extremes, the lever may be set to hold both idlers out of contact as shown in these views, and no power is transmitted from the main shaft M to the driven shaft S. The wheels and pulleys preferably all have their faces properly treated so as to make frictional contact with each other without slippage.

For reverse movement another lever 20 is pivoted at 21 to the base of the frame 2, and a link 22 carried by said lever has upright slotted bearings 23 in which are mounted two friction rollers 24 as best seen in Fig. 4. When now this lever is borne to the right in this view, the rollers are forced into contact with the power wheel 3 and the idler 7 respectively, and therefore into contact with each other, and motion is transmitted from the power shaft to the driven shaft, but in a reverse direction and at a moderate rate of speed. Means may be provided to prevent this lever being moved when the other lever is set in either of its extreme positions but this is not a feature of the present invention and therefore is not necessary of illustration. The levers stand adjacent the engine and therefore near the engineer, or in a small motor boat they would be near the single operator who would of course have control of the levers leading to the engine E. The parts are of the desired sizes, shapes, proportions and materials, and changes in details may be made without departing from the principle of my invention.

What is claimed as new is:

1. In a transmission mechanism, the combination with the power shaft having power wheels of different sizes, and the driven shaft adjacent thereto and having driven wheels; of two swinging shafts each having an idler adjacent one power wheel and the driven wheel therefor, and a hand lever for swinging said shafts simultaneously and in opposite directions, for the purpose set forth.

2. In a transmission mechanism, the combination with the power shaft having power wheels of different sizes, and the driven shaft adjacent thereto and having driven wheels; of two swinging shafts each having an idler adjacent one power wheel and the driven wheel therefor, a pivoted lever to which said shafts are connected on opposite sides of its pivot whereby movement of the lever swings said shafts simultaneously and oppositely; and manually operable mechanism for latching said lever in its various positions.

3. In a transmission mechanism, the combination with the power shaft having power wheels of different sizes, and a driven shaft standing oblique to the length of the main shaft and carrying driven wheels respectively opposite said power wheels and having beveled faces; of two idler wheels whereof each is offset beyond the space between a power wheel and its respective driven wheel, and means for moving said idlers into and out of contact with their respective wheels simultaneously and oppositely.

4. In a transmission mechanism, the combination with a frame, a power element journaled therein and having large and small power wheels fast thereon, and a driven element also journaled in the frame oblique to the power element and having driven wheels fast thereon respectively beneath the others; of two shafts pivoted at their outer ends in said frame between said other shafts, an idler on each pivoted shaft opposite the space between one power wheel and its subjacent driven wheel, and means for moving the inner ends of said shafts simultaneously and in respectively opposite directions, for the purpose set forth.

5. In a transmission mechanism, the combination with a power element having large and small power wheels fast thereon, and a driven element oblique to said power element and having conical driven wheels fast upon it opposite the power wheels respectively; of two idlers disposed out of line with said pairs of wheels and on one side of the same, means for moving the idlers simultaneously and oppositely into or out of contact with said pairs of wheels, a manually operable slotted bearing disposed at the other side of said power and driven elements, and two rollers carried in the slots thereof and adapted to be moved into contact with the smaller power wheel and its subjacent wheel and thrown into frictional contact with each other, for the purpose set forth.

In testimony whereof I affix my signature in presence of two witnesses.

MARTIN E. COX.

Witnesses:
  W. T. Harris,
  Daisy C. McConnor.